Nov. 9, 1926.

P. J. DARLINGTON

MICROMETER CALIPER

Filed Sept. 11, 1925   2 Sheets-Sheet 1

1,605,923

INVENTOR.
Philip J. Darlington
Harry R. Williams
ATTORNEY.

Nov. 9, 1926.
P. J. DARLINGTON
MICROMETER CALIPER
Filed Sept. 11, 1925
1,605,923
2 Sheets-Sheet 2
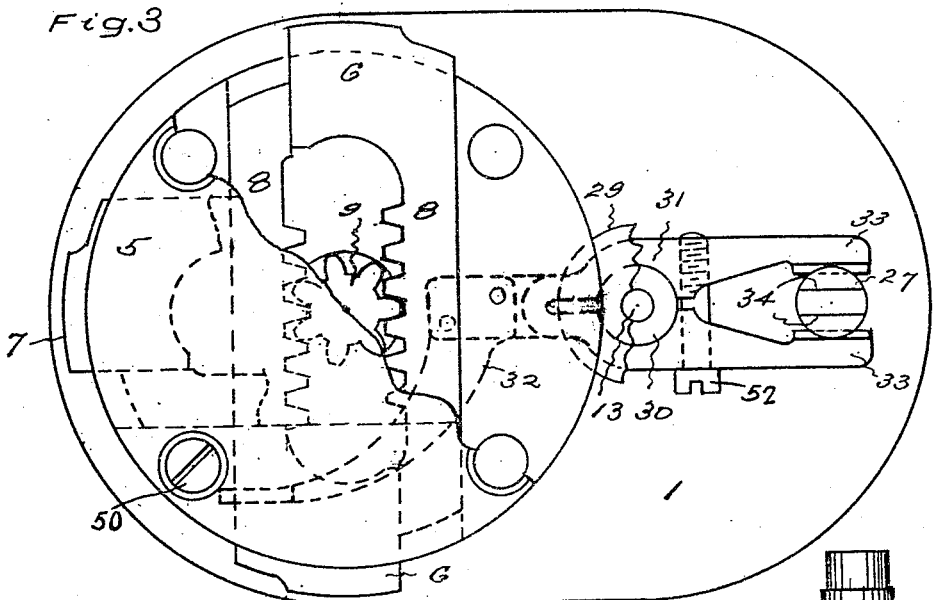
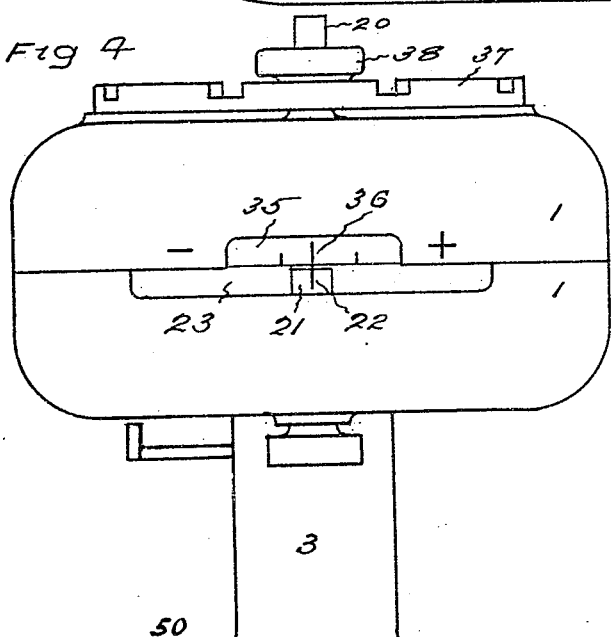
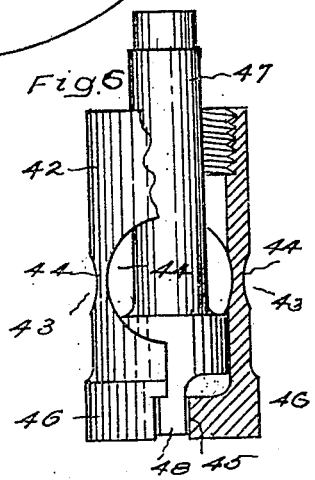
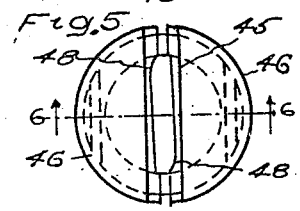
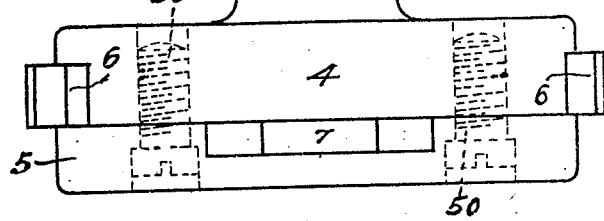
INVENTOR.
Philip J. Darlington
by
Harry P. Williams
ATTORNEY.

Patented Nov. 9, 1926.

1,605,923

UNITED STATES PATENT OFFICE.

PHILIP J. DARLINGTON, OF BROOKLINE, MASSACHUSETTS.

MICROMETER CALIPER.

Application filed September 11, 1925. Serial No. 55,708.

This invention relates to micrometer calipers, and especially to that type used in measuring inside diameters by comparison with reference standards to which the instrument is set.

The object of the present invention is to provide an instrument of this character which is relatively cheap to manufacture, which is simple to manipulate and has increased accuracy, adaptability and capacity over those of similar character which are in common use.

The device illustrated and described herein broadly comprises contact members arranged to be moved radially inward and outward, said contact members being adapted to be quickly adjusted to engage the walls of openings of widely different diameters, and an indicating member that is connected with the contact members through multiplying mechanism, said indicating member having a much greater but proportional movement with the contact members adjacent to a normally stationary but readily adjustable index dial, preferably the indicating member registering with zero on the dial when the contact members are in position of exact desired measurement. Means for operatively disconnecting the mechanism between the contact members and the indicating member, while the contact members are being set, and adjustable means for determining the depth of and centering the contact members in the hole to be measured are also provided.

Figure 1:
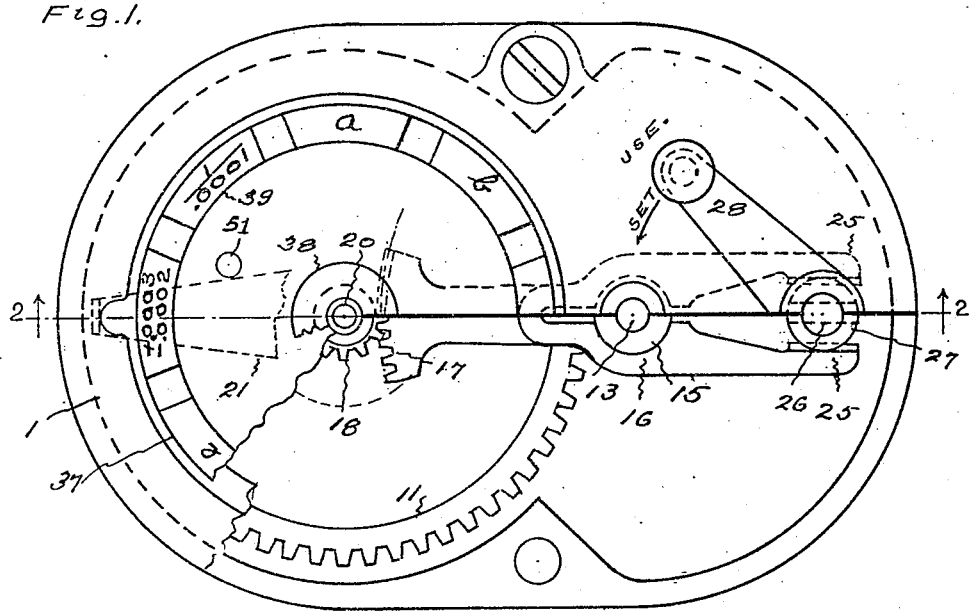
Figure 2:
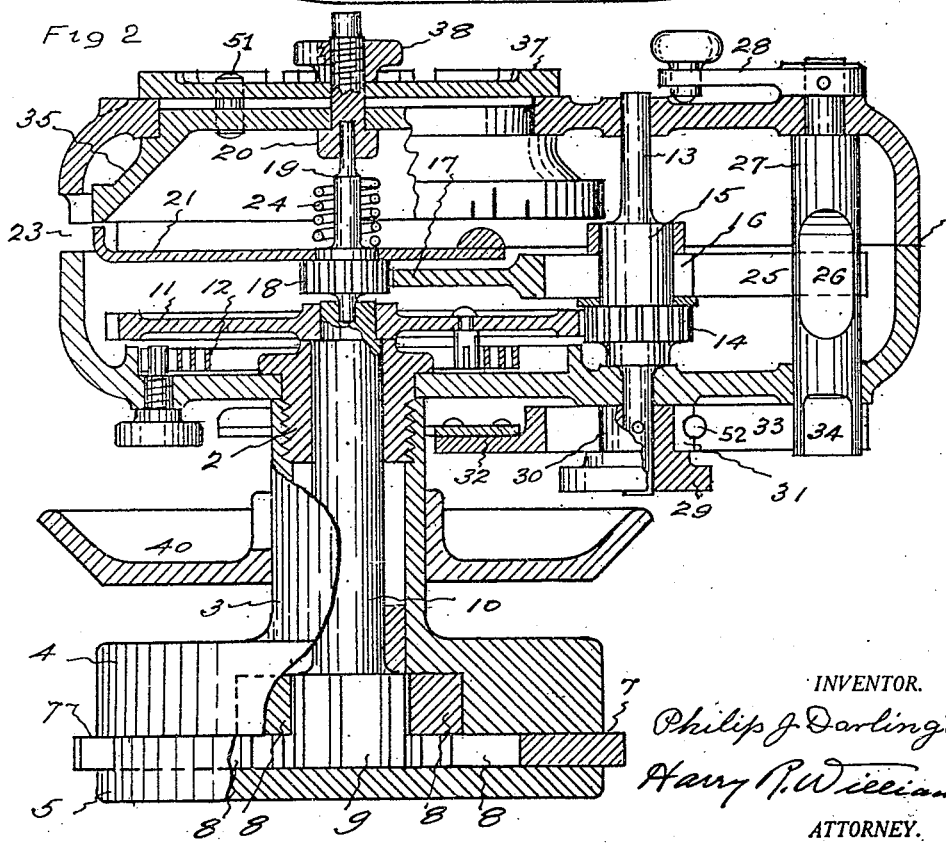

In the accompanying drawings Fig. 1 shows a plan of an instrument that embodies the invention, a portion of the upper section of the casing being cut away to expose the interior. Fig. 2 shows a vertical section on the plane indicated by the dotted line 2—2 on Fig. 1. Fig. 3 shows an inverted plan with a portion broken away. Fig. 4 shows an end elevation with the stop collar omitted. Fig. 5 is an inverted plan of an alternative construction of the measuring head for small holes. Fig. 6 shows an elevation of the modified form of head partly in section on the plane indicated by dotted line 6—6 on Fig. 5.

The device illustrated has a casing 1 formed in two sections. In an opening in the bottom of the lower section of the casing is a bushing 2 and screwed upon this bushing so as to depend from the casing is a tubular stem 3 of the measuring head 4. Removably fastened by screw 50 to the lower face of the measuring head is a cap 5.

A pair of measuring jaws 6 are arranged to slide in and out in a channel cut transversely across the bottom of the measuring head and below these and arranged to slide in and out in a channel cut in the top of the cap at right angles to the measuring jaw channel are a pair of centering jaws 7. The shanks 8 of each of the pairs of jaws are cut away so as to leave a space between them and the inner edges of the shanks are provided with rack teeth. Meshing with the teeth on the shanks of the measuring and centering jaws are the teeth of a pinion 9 that is secured to the lower end of the shaft 10 which extends upward through the stem and bushing into the lower section of the casing. Turning this shaft causes the measuring jaws and the centering jaws to move inward or outward depending upon the direction of rotation of the shaft. Other means such as suggest themselves may be employed instead of the pinion and racks for connecting the shaft with the jaws, whereby the rotation of the shaft will reciprocate the jaws radially.

A gear 11 is fastened to the upper end of this shaft. In the construction shown a helical spring 12 has one end connected with the casing and the other end connected with the gear and is tensioned so as to tend to rotate the shaft in a direction which will cause the measuring and centering jaws to move outward.

A spindle 13 is rotatably mounted in the casing parallel with the shaft, and fastened on this spindle is a pinion 14 that is in mesh with the gear on the shaft. In the casing on the spindle above the pinion is a drum 15. Sprung upon and frictionally carried by the drum is the split hub 16 of a gear segment 17.

Meshing with the gear segment is a pinion 18 fastened to an arbor 19 that is rotatably supported between the upper end of the shaft 10 and the head of a bolt 20. An indicating arm 21 provided with an index line 22, observable through a window 23 in the casing, is mounted on the pinion so as to rotate therewith. A light spring 24 is located on the spindle and connected in such a way as to maintain a turning effort on the arm and prevent backlash of the pinions and gears.

The separated ends 25 of the gear segment hub 16 are extended to each side of the flatted sections 26 of a rock shaft 27 which is rotatably mounted in the casing and provided with a handle 28. The separated ends of the segment hub are normally clear of the flat surfaces of the rock shaft but are designed to be wedged apart by the cylindrical sections of the rock shaft. By turning the handle the rock shaft can be rotated so as to spread the extensions and release the bind of the split hub upon the drum and hold the gear segment and indicating arm with its index line in central or zero position while adjustment of the jaws is being effected. Fastened to the lower end of the spindle 13 outside of the casing is a button 29. The stem 30 of this button is normally gripped by the split hub 31 of the finger lever 32. A screw 52 may be employed, if desired, to afford a supplemental clamping means for the split hub. The separated ends 33 of this split hub are extended to each side of the flatted sections 34 on the rock shaft 27. These separated extensions of the hub of the finger lever are normally out of contact with the flat surfaces of the rock shaft but are designed to be wedged apart by the cylindrical surfaces when the shaft is rotated. Turning the rock shaft by means of its handle releases the hub of the gear segment and at the same time releases the hub of the finger lever, permitting the spindle to be rotated by means of the button for setting the measuring and centering jaws and at the same time holding the indicating arm and the finger lever in central position. After the jaws have been set the rock shaft is turned back permitting the split hubs to resume their grasp upon the spindle.

A dial 35 with different groups of graduations 36 around its circumference is arranged in the upper section of the casing so that it may be turned to expose any of the sets of graduations through the window 23 and in co-operative relation to the index line on the indicating arm. A clamping disk 37 is fitted on the outside of the casing and connected with the dial by a pin 51 so the two will rotate together. The bolt 20 passes through the axis of the dial and clamping disk and outside is provided with a thumb nut 38. When the nut is loosened the dial may be rotated by turning the clamping plate for adjusting the dial graduations with relation to the index line on the indicating arm and when the nut is tightened the parts are clamped in the position to which they are adjusted. The rim of the clamping disk is divided into segments and each is marked with indications 39 that identify the groups of graduations on the dial.

A stop collar 40 with a conical lower face is adjustably mounted on the stem of the measuring head. This collar may be moved along the stem to regulate the depth to which the measuring jaws are located and consequently determine the exact position in the hole that the measurements are taken. This collar also centers the measuring head when it is inserted into the opening to be gaged.

For measuring small holes the modified construction illustrated in Figs. 5 and 6 may be employed. The stem 42 of this modified form is adapted to be screwed upon the bushing 2 that projects through the lower section of the casing in the same manner as the stem of the measuring head previously described. This stem 42 is tubular and is provided with transverse openings 43 which leave thin flexible sections 44 between the upper and lower part of the stem. A slot 45 is cut across the bottom of the stem so as to leave two practically semi-circular sections 46 which sections form the measuring jaws of this modification. The shaft 47 which corresponds with the shaft 10 of the first form described, has at its lower end two teeth or cams 48. When the shaft is rotated these teeth cam apart and spread the measuring jaws proportional to a small rotary displacement of the shaft.

When the device is to be used, a measuring head with jaws of suitable length and a depth collar on the stem is attached to the casing. The clamp plate is loosened and turned so as to turn the dial into position reading zero of the specified group of graduations to be used with relation to the index line on the indicating arm. The clamp plate is then fixed in position. The rock shaft handle is turned into "set" position and the jaws are drawn in by means of the button. The head is entered into the hole of standard size and the button released to allow the spring to throw the jaws out against the wall of the hole. The rock shaft handle is then turned to the "use" position, clamping the indicator and finger in operative condition.

Thereafter in taking successive measurements the contact jaws or measuring members are drawn in by the pressure of a finger on the lever that is below the casing. When pressure is released from the lever the helical spring turns the parts so as to move the jaws outward. The movement of the jaws outward is transferred through the multiplying mechanism to the indicating arm and the index line on the end of the indicating arm reading with the graduations on the dial shows whether or not the hole being measured is the same or is smaller or larger than the standard.

The instrument shown is adjustable for a considerable range of diameters. With jaws of different lengths and heads of different sizes, the range of measurement may be greatly extended, as the same casing, multiplying mechanism and graduations may be correctly used with all heads whether of the type first described or that of the modified form. The device is simple to use, it is easily set and quickly manipulated so as to give accurate indications.

The invention claimed is:

1. A micrometer caliper comprising a casing and a measuring head attached thereto, said head carrying radially movable measuring jaws and means rotatable relatively to the casing for moving the jaws inward and outward, and said casing supporting a dial and containing an indicating arm rotatable with relation to the dial and toothed gearing operatively connecting the rotatable jaw moving means with the indicating arm.

2. A micrometer caliper comprising a casing and a measuring head attached thereto, said head carrying radially movable measuring jaws and means rotatable relatively to the casing for moving the jaws inward and outward, and said casing supporting a dial and containing an indicating arm rotatable with relation to the dial and toothed gearing operatively connecting the rotatable jaw moving means with the indicating arm, means operable from the exterior of the casing for rotating the gearing and setting the jaws, and means operable from the exterior of the casing for disconnecting the gearing from the indicating arm while the jaws are being set.

3. A micrometer caliper comprising a casing and a measuring head attached thereto, said head carrying radially movable measuring jaws and means rotatable relatively to the casing for moving the jaws inward and outward, and said casing supporting a dial and containing an indicating arm rotatable with relation to the dial, toothed gearing operatively connecting the rotatable jaw moving means with the indicating arm and a spring connected to cause the gearing to move the jaws outward and the arm to indicate the position of the jaws, with a finger lever on the exterior of the casing adapted to hold the gearing with the jaws retracted and when moved to release the gearing and permit the spring to move the jaws outward.

4. A micrometer caliper comprising an adjustable measuring member, a rotary indicating member, rotary mechanism operatively connecting said members, said mechanism including a cylindrical element and an element frictionally gripping said cylindrical element, and means for releasing said gripping element from the cylindrical element and holding the indicating member during adjustment of said measuring member.

5. A micrometer caliper comprising an adjustable member, a rotary indicating member, rotary mechanism operatively connecting said members, said mechanism including a spindle and a gear element having a split hub frictionally gripping the spindle, and a cam arranged to open said hub and to hold the indicating member during adjustment of said measuring member.

6. A micrometer caliper comprising an adjustable measuring member, an indicating member adapted to show the displacement of said measuring member, means operatively connecting said indicating member and said measuring member, a hand lever operatively connected with said measuring member, and means for operatively disconnecting and holding said hand lever stationary during adjustment of said measuring member.

7. A micrometer caliper comprising an adjustable measuring member, an indicating member adapted to show the displacement of said measuring member, means operatively connecting said indicating member and said measuring member, mechanism for adjusting the measuring member, a hand lever normally connected with said adjusting mechanism, and means for operatively disconnecting and holding said hand lever stationary during adjustment of said movable member.

8. A micrometer caliper comprising a measuring head, carrying two radially movable contact members, a rotary shaft extending between said members, means on said shaft engaged with and adapted to effect radial movements of said members, an indicating member, and mechanism connecting said shaft and the indicating member whereby the rotation of the shaft is communicated to the indicating member.

9. A micrometer caliper comprising a measuring head carrying two radially movable contact members, a rotary shaft extending between said members, means on said shaft engaged with and adapted to effect radial movements of said members, a spring connected to rotate the shaft and move the contact members outwardly, an indicating member, and mechanism connecting said shaft and indicating member whereby the rotation of the shaft is communicated to the indicating member.

10. A micrometer caliper having a casing and attached thereto a measuring head carrying four radially movable contacting jaws, a central pinion engaging and adapted to move said jaws inward and outward, and a spring connected between the casing and pinion and adapted to rotate said pinion and move the jaws outward.

11. A micrometer caliper having a cylindrical head, a channel formed diametrically across the lower face of said head, a cap covering said channel, contact jaws radially adjustable in said channel, means for radially adjusting said jaws into contact with the work, and means operatively connected with the jaws for indicating their positions.

12. A micrometer caliper having a cylindrical head, an end cap attached to said head, a channel formed diametrically across the lower face of said head, a channel formed diametrically across the inner face of said cap, said channels being at right angles to each other, radially adjustable jaws slidable in said channels, means for radially adjusting said jaws into contact with the work, and means operatively connected with the jaws for indicating their positions.

PHILIP J. DARLINGTON.